United States Patent
Ku et al.

(10) Patent No.: US 9,060,035 B2
(45) Date of Patent: Jun. 16, 2015

(54) METHOD AND APPARATUS FOR IDENTIFYING A SUBSCRIBER HOME DOMAIN IN A COMMUNICATION NETWORK

(75) Inventors: Bernard Ku, Austin, TX (US); Lakshminarashimhan Naidu, Pearland, TX (US); Armstrong Soo, San Ramon, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 103 days.

(21) Appl. No.: 13/213,662

(22) Filed: Aug. 19, 2011

(65) Prior Publication Data

US 2013/0044644 A1 Feb. 21, 2013

(51) Int. Cl.
*H04L 29/06* (2006.01)
*H04L 29/08* (2006.01)

(52) U.S. Cl.
CPC .......... *H04L 67/306* (2013.01); *H04L 65/1016* (2013.01); *H04L 65/1006* (2013.01); *H04L 65/1069* (2013.01); *H04L 65/1073* (2013.01)

(58) Field of Classification Search
USPC ................................................ 370/259, 352
See application file for complete search history.

(56) References Cited

U.S. PATENT DOCUMENTS

| | | | |
|---|---|---|---|
| 7,852,838 B2 | 12/2010 | Miller et al. | |
| 8,306,022 B1 * | 11/2012 | Cranor et al. | 370/356 |
| 2004/0243711 A1 | 12/2004 | Rajaniemi | |
| 2006/0120517 A1 * | 6/2006 | Moon et al. | 379/45 |
| 2010/0030904 A1 | 2/2010 | Oda et al. | |
| 2010/0095337 A1 * | 4/2010 | Dua | 725/110 |
| 2010/0157977 A1 * | 6/2010 | Ku | 370/352 |
| 2010/0228717 A1 | 9/2010 | Meinsen | |

* cited by examiner

*Primary Examiner* — Michael Thier
*Assistant Examiner* — Brian Cox
(74) *Attorney, Agent, or Firm* — Chiesa Shahinian & Giantomasi PC (57) ABSTRACT

A method, apparatus and computer-readable medium for identifying a subscriber home domain in a communication network are described. A national subscriber profile is partitioned into regions and a NAPTR resource record is modified to identify in which region a particular subscriber is located. In response to a calling party requesting that a connection to a called party be established, a database is queried to provide a modified NAPTR record which identifies the region in which the called party is located. A connection can then be established without polling each region.

6 Claims, 6 Drawing Sheets

600
$ORIGIN 2.2.2.2.5.5.5.2.1.5.1.e164.arpa.
    IN NAPTR 100 10 "u" "E2U+sip"    "!^.*$!sip:+15125552222@central.att.net!".
602

604
$ORIGIN 5.8.4.5.2.7.3.2.1.5.1.e164.arpa.
    IN NAPTR 100 10 "u" "E2U+sip"    "!^.*$!sip:+15123725485@west.att.net!"
606

608
$ORIGIN 5.2.4.5.2.7.3.2.1.5.1.e164.arpa.
    IN NAPTR 100 10 "u" "E2U+sip"    "!^.*$!sip:+15123725425@east.att.net!"
610

METHOD AND APPARATUS FOR IDENTIFYING A SUBSCRIBER HOME DOMAIN IN A COMMUNICATION NETWORK

FIELD OF THE DISCLOSURE

The present disclosure relates generally to communication networks and more particularly to IP Multimedia Subsystem (IMS) based Universal Voice Platform (UVP) for communications.

BACKGROUND

Subscribers in a communication network are generally each provided with a unique identifier. As the number of subscribers in a network grows, the potential time required to locate a particular subscriber increases. As the time required to locate a particular subscriber increases, the chances of an attempted connection failing increase as well. In addition, a large communication network may be comprised of smaller networks. When a particular subscriber is to be located, each of the smaller networks must be polled to determine if the particular subscriber is located in the smaller network. In addition to locating a particular subscriber, features that should be provided to a subscriber for a communication must be determined as well. This determination also increases the time required to establish a connection between two subscribers which also increases the chances of an attempted connection failing.

SUMMARY

In one embodiment, a method for determining a called party home domain in a partitioned network comprises receiving a request from a calling party to establish communication with a called party. A name authority pointer associated with the called party is determined based on the request and the name authority pointer comprises data identifying a home domain associated with the called party. The request can comprise an E.164 phone number associated with the called party. The name authority pointer associated with the called party can be determined by querying a database to determine the name authority pointer associated with the called party. A domain name of a device located in the home domain associated with the called party as well as an IP address of the device can also be determined. A request can be transmitted to the home domain associated with the called party based on the name authority pointer associated with the called party.

An apparatus for performing the above method and a computer-readable medium storing instructions for causing a computing device to perform operations similar to the above method are also disclosed.

These and other advantages of the general inventive concept will be apparent to those of ordinary skill in the art by reference to the following detailed description and the accompanying drawings.

DETAILED DESCRIPTION

Figure 1:
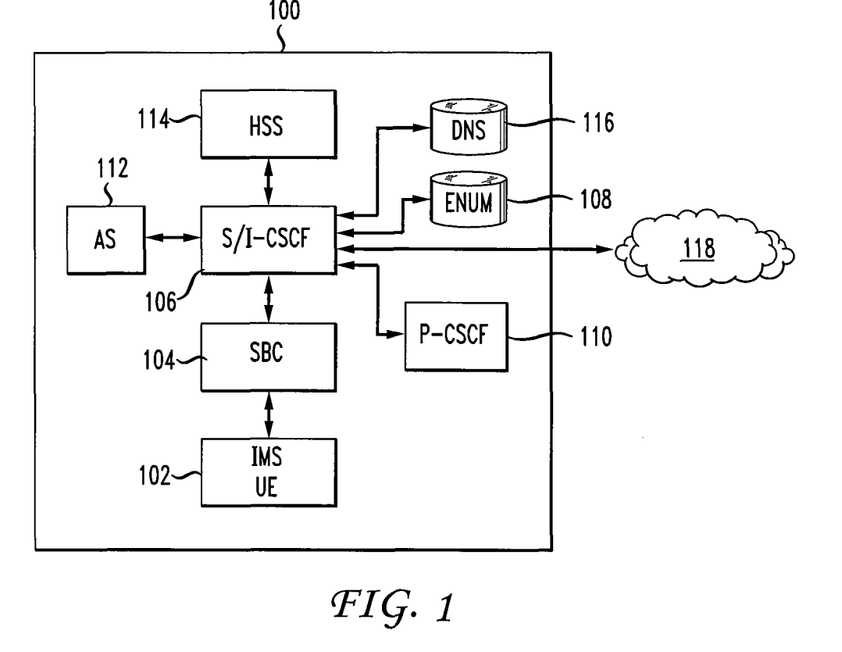
FIG. 1 shows a high level block diagram of an IP Multimedia Subsystem (IMS) network for providing IP based multimedia services according to one embodiment.

FIG. 1 shows a high level block diagram of an IP Multimedia Subsystem (IMS) network 100 for providing IP based multimedia services. It should be noted that one or more functions (also referred to as components) may be run on a single implementer (i.e., specific hardware or node) and that various embodiments may have one or more functions distributed across a number of implementers or nodes. Functions, in one embodiment, are conventionally linked by standardized interfaces which allow communication between functions. Each of the functions of the system shown in FIG. 1 performs operations related to providing IP based multimedia services.

IMS UE 102 is an IP Multimedia User Equipment for a calling party. IMS User Equipment may comprise one or more of a variety of customer end point devices (e.g., wireline or wireless phones, personal computers, laptop computers, Personal Digital Assistants (PDAs), etc. IMS UE 102 is located in its respective IMS Network 100. IMS UE 102 communicates with other functions in the IMS network 100 via Session Border Control (SBC) 104.

SBC 104 performs session border control and functions to control the one or more data streams related to a particular IMS communication session. SBC 104 can include functionality (e.g. security related functionality) to control the flow of data between an internal and an external network. SBC 104 is used in some networks (such as VoIP networks) to exert control over the signaling and the media streams involved in setting up, conducting, and tearing down voice calls or other interactive media communications.

IMS network 100 includes multiple Session Initiation Protocol (SIP) servers which are known as Call Session Control Functions (CSCFs). The CSCFs are used to process SIP signaling packets and perform different functions.

Serving/interrogating Call Session Control Function (S/I-CSCF) 106 is the central node of IMS network 100 and is conventionally an SIP server. S/I-CSCF 106 performs session control functions and handles SIP registrations which relate user locations and SIP addresses. S/I-CSCF 106 can inspect every message and determine which application server or servers an SIP message should be forwarded to. S/I-CSCF 106 routes messages using tElephone NUMbering (ENUM) lookups. ENUM database 108 stores ENUM information pertaining to calling and called parties. There may be multiple S/I-CSCFs in a network in order to distribute communication session loads and increase availability. An S/I-CSCF is in communication with various IMS functions including Proxy-CSCFs (P-CSCFs, e.g., P-CSCF 110 of FIG. 1), Application Server (AS, e.g., AS 112 of FIG. 1), Home Subscriber Server (HSS, e.g. HSS 114 of FIG. 1), and Domain Name Server (DNS) database (e.g., DNS database 116). An S/I-CSCF may be in communication with other devices in the IMS network as well.

Proxy Call Session Control Function (P-CSCF) 110 intercepts SIP INVITE messages and analyzes them to determine the desired called party and whether the messages contain logic requiring analysis by AS 112. P-CSCF 110 can be a first point of contact for user equipment or can be in communication with UE 102 via a Session Border Controller (SBC) such as SBC 104 which can be used to implement some of the functionality of the P-CSCF. P-CSCF 110 may inspect every message from UE 102 and may also authenticate and establish a security association with UE 100 to prevent spoofing and replay attacks. Calling party and called party IMS networks typically each have their own P-CSCFs which can be in communication with user equipment, other CSCFs, and Application Servers (AS). P-CSCFs may be in communication with other devices in the IMS network as well.

Application Server (AS) 112 hosts and executes various services such as caller ID, call waiting, push to talk, etc. AS 112 may interface with S-CSCF 106 using Session Initiation Protocol (SIP) to provide these services and AS 112 may operate in different modes depending on the service provided. AS 112 may operate in SIP Proxy mode, SIP user agent mode, or SIP back to back user agent mode. An AS may be located in a home network, such as AS 108 shown in IMS network 100, or in an external third party network.

A Home Subscriber Server (HSS), such as HSS 114, is a master database that supports the IMS functions that actually handle communication sessions. HSS 114 contains information related to subscribers such as user profiles and performs authentication and authorization of a particular user.

A Domain Name System (DNS), such as DNS 116, translates domain names into numerical identifiers such as in IP address. An IP address of a IMS function such as an Interrogating CSCF (I-CSCF) may be maintained a DNS allowing servers to locate a specific I-CSCF and use it as a forwarding point for messages.

IMS network 100 communicates with other IMS networks as well as other devices via network 118. IMS network 100 can serve a particular group of users such as a group of users located in a particular geographic area.

Figure 2:
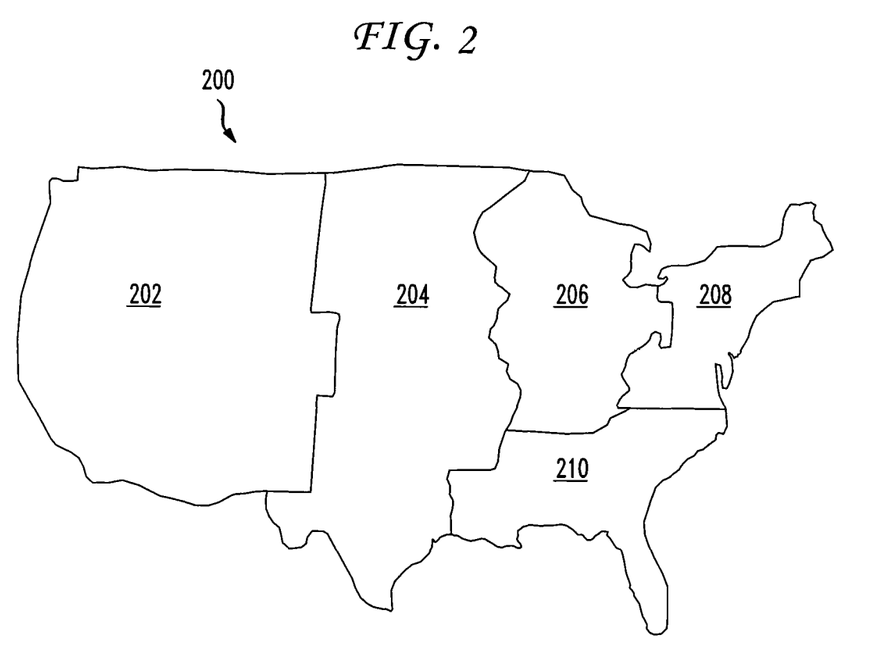
FIG. 2 depicts a geographic area divided into a plurality of regions.

FIG. 2 depicts a map 200 of the United States, in this embodiment, divided (also referred to as partitioned) into five regions designated as IMS Serving Areas (ISAs). The five regions are West ISA 202, Central ISA 204, Great Lakes ISA 206, Northeast ISA 208, and Southeast ISA 210. The five regions together form a Universal Voice Platform (UVP) Regional Design which can be configured, in one embodiment, to carry Long Term Evolution (LTE) Voice data. The division of the geographic area into regions, along with additional modifications described herein, facilitate the identification of user/subscriber home domains for timely call completion. In one embodiment, access to a specific user profile associated with a subscriber also identifies appropriate call treatment (e.g., billing, features, etc.).

Each region shown in FIG. 2 has its own IMS network, such as IMS network 100 shown in FIG. 1. In order to determine a specific subscriber within a particular region, an S-CSCF queries its associated tElephone Number Mapping (ENUM) and Domain Name Server (DNS) databases.

Figure 3:
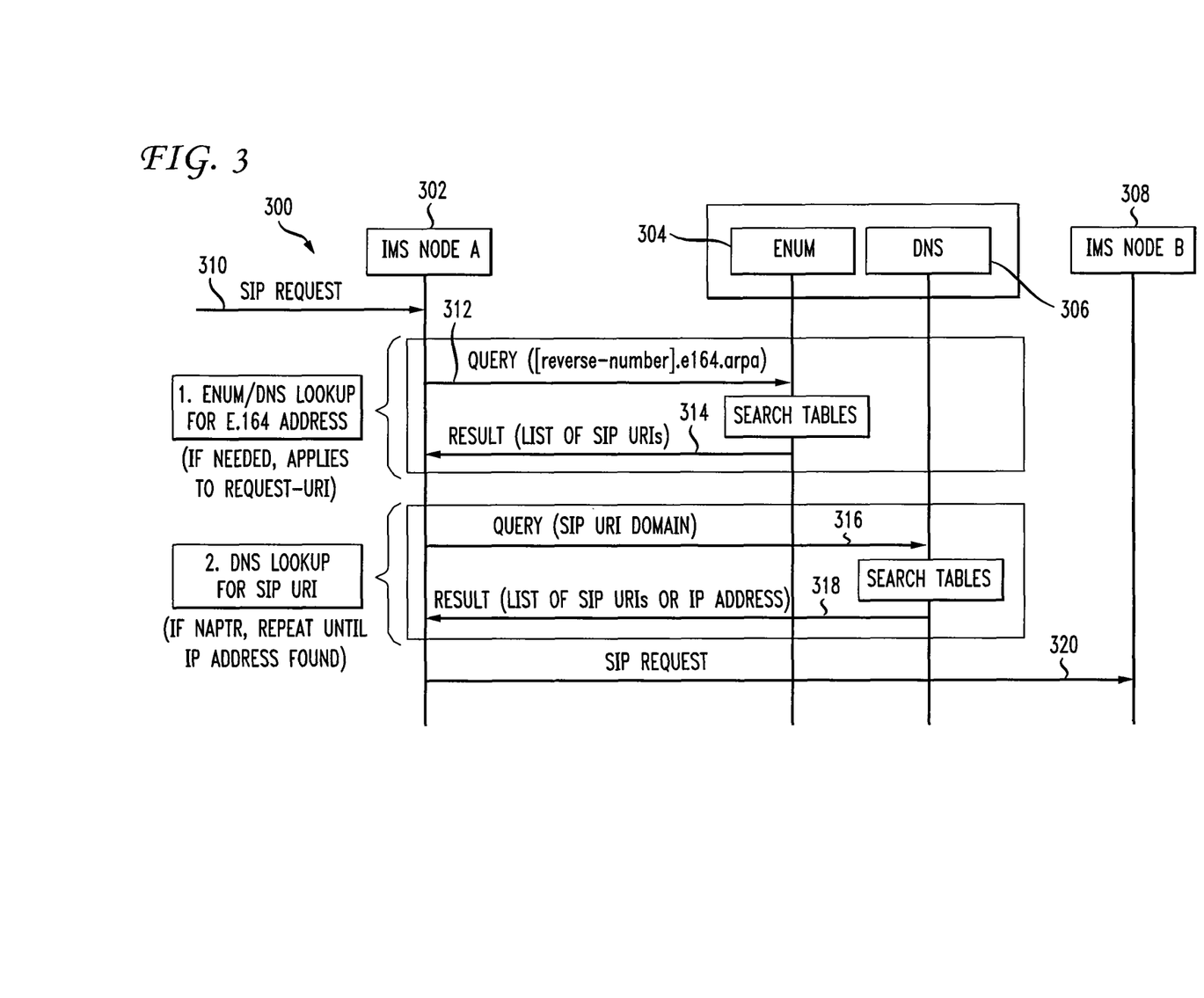
FIG. 3 depicts a call flow diagram according to one embodiment.

FIG. 3 depicts call flow diagram 300 in which an ENUM database and a DNS data base are queried to retrieve information. IMS Node A 302, in one embodiment, is a S-CSCF, such as S-CSCF 106 shown in FIG. 1. ENUM 304 is a database, such as ENUM database 108 of FIG. 1, in which tables and records are stored, the tables and records indicating relationships between E.164 addresses and Session Initiation Protocol Uniform Resource Identifiers (URIs), e.g. SIP URIs. DNS 306 is also a database, such as DNS database 116 of FIG. 1, in which tables and records are stored, the tables and records indicating relationships between URIs (e.g. SIP URIs) and IP addresses.

As illustrated in FIG. 3, an SIP request 310 is transmitted to IMS Node A 302 (e.g., S-CSCF). In response to SIP request 310, IMS Node A 302 transmits a reverse number query 312 to ENUM 304 to search tables contained in ENUM 304. In response to query 312, ENUM 304 transmits a result 314 including a list of URIs based on data (i.e., an E.164 address) in SIP request 310. In an illustrative example, reverse number query 312 can be "$ORIGIN 2.2.2.2.1.1.1.2.1.5.1.e164.arpa" and in response, result 314 can be "NAPTR 10 100 "u" "E2u+sip" "!^.*$!sip:1+5121112222@example.com!" ".

Query 316 concerning an SIP URI domain is then transmitted from IMS Node A 302 to DNS 306. In response to query 316, DNS 306 transmits a result 318 including the IP address based on the domain "example.com" as included in the SIP URI to IMS Node A 302. An SIP Request 320 is then transmitted from IMS Node A 302, to IMS Node B 308 (e.g. I-CSCF of the caller's IMS network) based on the information obtained via queries 312,316.

The flow diagram of FIG. 3 illustrates how a subscriber phone number can be used to determine additional identifiers for a particular subscriber. For example, a phone number "+1 (512) 555-5485" can be used to determine a Fully Qualified Domain Name (FQDN), such as "5.8.4.5.5.5.5.2.1.5.1.e164.arpa". The FQDN can then be used to query the associated Domain Name Server (DNS) to determine a Name Authority Pointer (NAPTR). The DNS server, in response, provides a list of Universal Resource Identifiers. For example, URIs such as "SIP:+15125552151@ims.uverse.att.net", "mailto: ku@lavs.buu.com", and "tel:+1-512-555-5000".

An ENUM, such as ENUM 108 contains tables and records associating E.164 numbers with NAPTR records. For example, a telephone number "+19725551234" can be used to generate the query "$ORIGIN 4.3.2.1.5.5.5.2.7.9.1.e164.arpa" which can be used to query an ENUM database. In response the query "$ORIGIN 4.3.2.1.5.5.5.2.7.9.1.e164.arpa", an ENUM database can return the following: "IN NAPTR 100 10 "u" "E2U+SIP" "!^.*$!sip:user@example.com!" wherein "IN" represents the query class, in this case Internet, "NAPTR" represents the query type, "100" represents the order, "10", represents the preference, "E2U+SIP" represents the resolution service (E164 to URL) and protocol, "!^.*$!" represents a greedy search, and "sip:user@example.com" represents the replacement NAPTR resource record for the next DNS resolution, and "!" is a delimiter. A query can return multiple NAPTR resource records identifying additional replacement NAPTR resource records with varying preferences. In one embodiment, the NAPTR resource record stored in ENUM 108 is modified to facilitate identification of a region in which a subscriber is located.

As shown in FIG. 2, a national subscriber profile can be partitioned into regions. Since the national subscriber profile is partitioned according to regions, the IMS core needs to know the home domain (CSCF and HSS of a called party) in order to inquire according to the called party. If the home domain of a particular called party is not known, call treatment related to the subscriber profile cannot be applied (i.e., additional services and features as well as billing arrangements can not be applied). Further, there will be a definite delay in the call processing and this delay will eventually cause all inbound and outbound calls to be dropped.

In order to implement the national subscriber profile shown in FIG. 2, the entire geographic area is divided into regions. Each region includes an IMS network 100 with an HSS, such as HSS 114 of FIG. 1, which does not communicate outside of its region. In one embodiment, there can be a master ENUM database and a local copy of the master ENUM database can be downloaded by each region. New IMS networks can be added to the national subscriber profile to facilitate growth. The national network can grow by adding regional IMS networks similar to IMS network 100 with supporting network elements such as P/S/I-CSCF, HSS, DNS, and ENUM.

In one embodiment, an ENUM-based resolution of multiple HSS/subscriber home domains is used to facilitate operations between regions (i.e., in one embodiment, the five regions shown in FIG. 2). S/I-CSCF can query an ENUM database which provides NAPTR resource records which are modified to include data identifying a region in which a subscriber is located. For example, a NAPTR resource record can be modified to include the identifier "@central.att.net" which indicates that the particular subscriber is located in Central ISA 204 of FIG. 2. More specifically, in response to querying an ENUM database containing modified NAPTR resource records with the query "$ORIGIN 2.2.2.2.5.5.5.2.1.5.1.e164.arpa" the ENUM database returns "IN NAPTR 100 10 "u" "E2U+sip" "!^.*$!sip:+15125552222@central.att.net" wherein the "@central.att.net" identifies the region in which the subscriber identified in the query is located.

Figure 4:
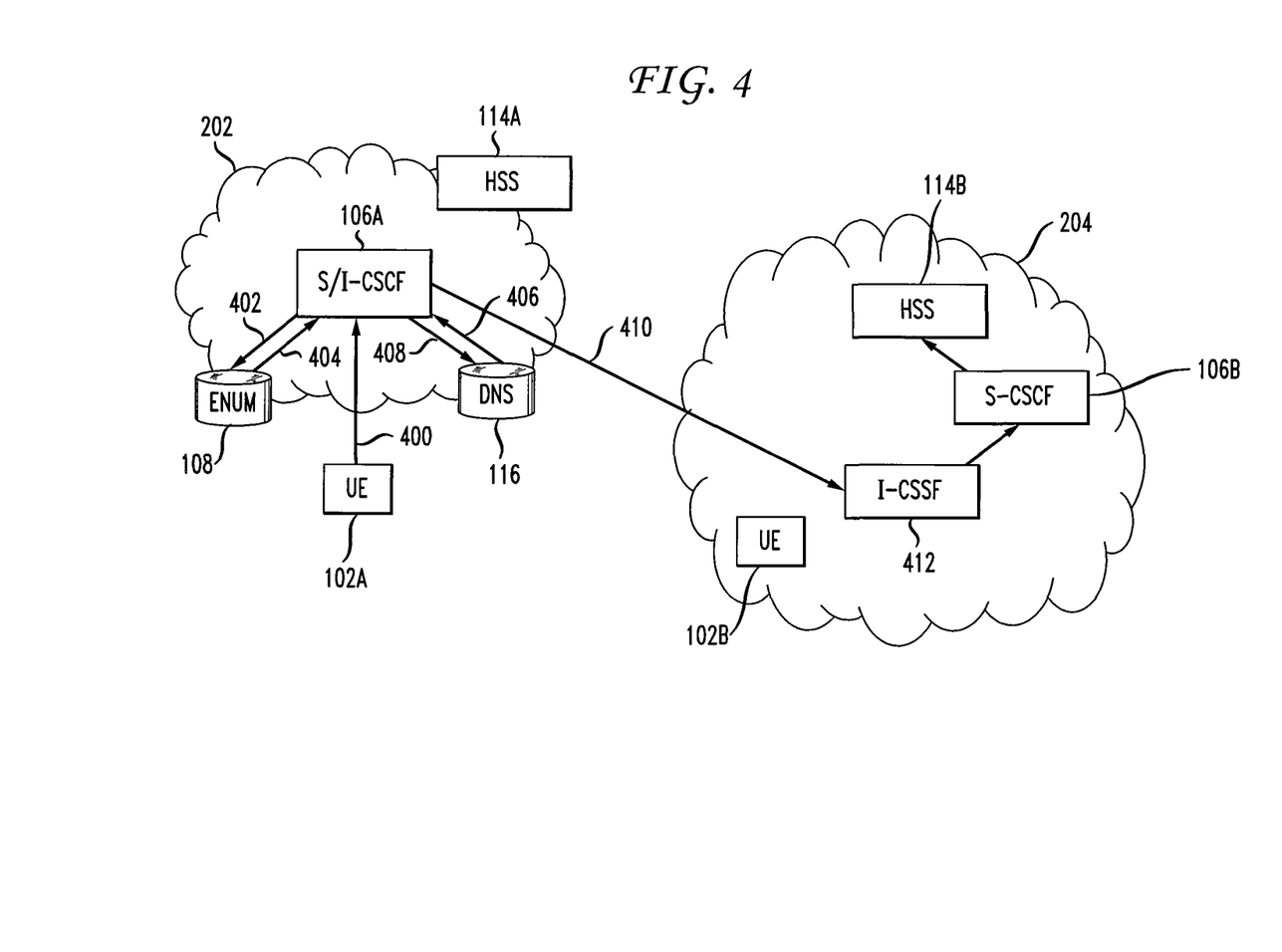
FIG. 4 depicts a flow diagram illustrating the identification of a subscriber's home domain according to one embodiment.

FIG. 4 depicts a flow diagram according to one embodiment in which a subscriber in one region is attempting to contact a subscriber located in a different region. S/I-CSCF 106A is shown located in West ISA 202 (as shown in FIG. 2) and S-CSCF 106B located in Central ISA 204. It should be noted that although S/I-CSCF 106A and S-CSCF 106B are shown located in West ISA 202 and Central ISA 204, respectively, the method described herein applies to any two S-CSCFs located in the same or different ISAs. UE 102A is associated with a subscriber located in West ISA 202 who wants to communicate with UE 102B which is associated with a subscriber located in Central ISA 204. At step 400 (shown in FIG. 5) UE 102A transmits a request indicating that the subscriber associated with UE 102A wants to communicate with the subscriber associated with UE 102B. In one embodiment, the request is a SIP Request (such as SIP Request 310 shown in FIG. 3). In response to receiving the SIP Request, at step 402, S/I-CSCF 106A transmits a query to ENUM database 108. For example, S/I-CSCF 106A can transmit the query "2.2.2.2.5.5.5.2.1.5.1.e164.arpa" to ENUM database 108. In response to receiving the query from S/I-CSCF 106A, ENUM database 108 determines a query result based on the query received. At step 404, ENUM database 108 transmits a result, in this case, "E2U+Sip:sip:+15125552222@central.att.net". It should be noted that the "@central.att.net" indicates that the subscriber associated with UE 102B is located in Central ISA 204 and this additional information is contained in a modified NAPTR record or table stored in ENUM database 108. At step 406, S/I-CSCF 106A transmits a DNS query, in this case "ICSCF@central.att.net", to DNS 116. In response, DNS 116 locates a record or table associated with I-CSCF 412 located in Central ISA 204 to determine the IP address of I-CSCF 412 which, in this example, is "12.1.1.20" and in step 408 transmits a response to the query of step 406 to S/I-CSCF 106A. At step 410, S/I-CSCF 106A transmits an SIP Request to I-CSCF 412 identifying UE 102B as the called party UE 102A is trying to connect with. In response, I-CSCF 412 communicates with HSS 114B via S-CSCF 106B in order to determine call treatment associated with UE 102B. A bearer connection between UE 102A and 102B can then be made in a conventional manner.

Figure 5:
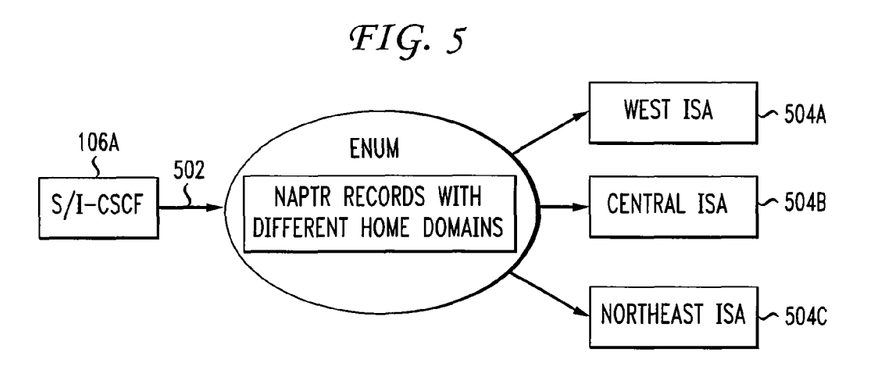
FIG. 5 depicts a schematic of a component querying an ENUM database.

FIG. 5 depicts a schematic of S/I-CSCF 106A querying ENUM 108 which, in response, provides NAPTR records modified according to one embodiment. S/I-CSCF 106A transmits query 502 to ENUM 108. Query 502, in one embodiment, can be in a format such as "$ORIGIN 2.2.2.2.5.5.5.2.1.5.1.e164.arpa". In response to query 502, ENUM 108 returns a NAPTR record specifying the home domain of the party identified in the query. For example, the NAPTR record can specify that the party identified in the query is located in a specific home domain as identified in query result 504A as West ISA (e.g., West ISA 202 of FIG. 2), in query result 504B as Central ISA (e.g. Central ISA 204 of FIG. 2) or in query result 504C as Northeast ISA (e.g. Northeast ISA 208 of FIG. 2). It should be noted that ENUM 108 can receive queries from other network components including other CSCFs such as an I-CSCF or S-CSCF.

Figure 6:
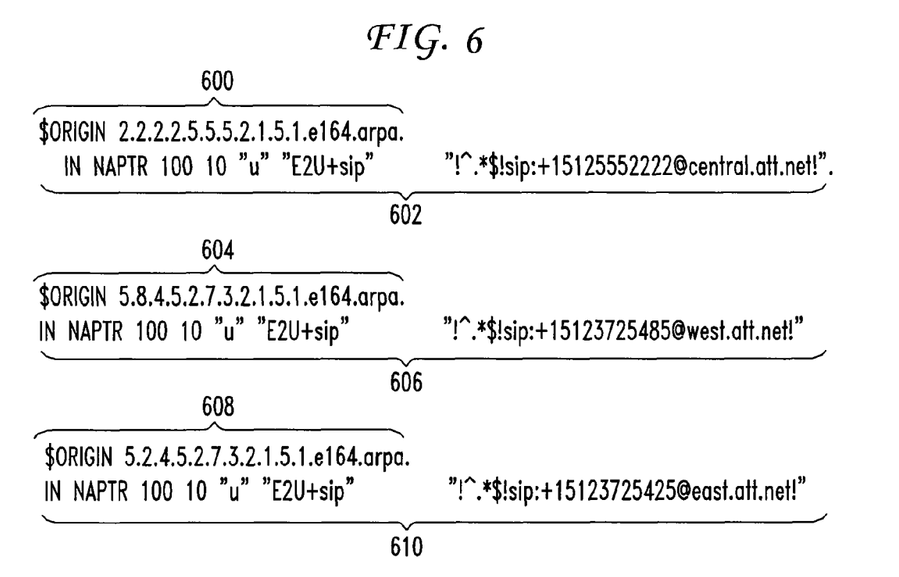
FIG. 6 depicts several queries and query results according to one embodiment.

FIG. 6 depicts several examples of queries transmitted to an ENUM database, such as ENUM 108, and query results in response to the queries. In response to query 600, an ENUM database including modified NAPTR records returns query result 602. Query result 602 contains "central.att.net" which identifies the home domain of the subscriber identified in query 600. Similarly, query results 606 and 610 identify subscriber home domains "west.att.net" and "east.att.net" of the subscribers identified in queries 604 and 608 respectively. NAPTR records modified as described above facilitate the identification of a subscriber's home domain.

Figure 7:
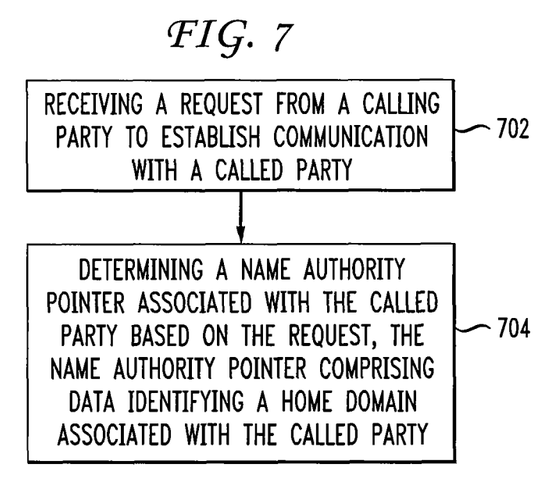
FIG. 7 depicts a method of determining a subscriber's home domain according to one embodiment.

FIG. 7 depicts a method according to one embodiment for determining a called party home domain in a partitioned network at a network component such as S/I-CSCF 106A (shown in FIG. 4). At step 702, the network component receives a request from a calling party to establish communication with a called party. In response, at step 704, the network component determines a name authority pointer associated with the called party based on the request, the name authority pointer comprising data identifying a home domain associated with the called party. As described above, the determination of the home domain associated with the called party allows the network component to contact the identified home domain without polling all other home domains in the network.

As described above, modification of a NAPTR record prevents multiple attempts to locate a particular subscriber by identifying the region in which a particular subscriber is located. Without the modification of the NAPTR record and the methods described, subscribers would be located by querying multiple networks. In addition, after a subscriber is located, additional time to determine features the subscriber should be provided with is required. As a result, conventional methods used in attempting to connect two subscribers fail more often as the number of subscribers and sub-networks increases.

Figure 8:
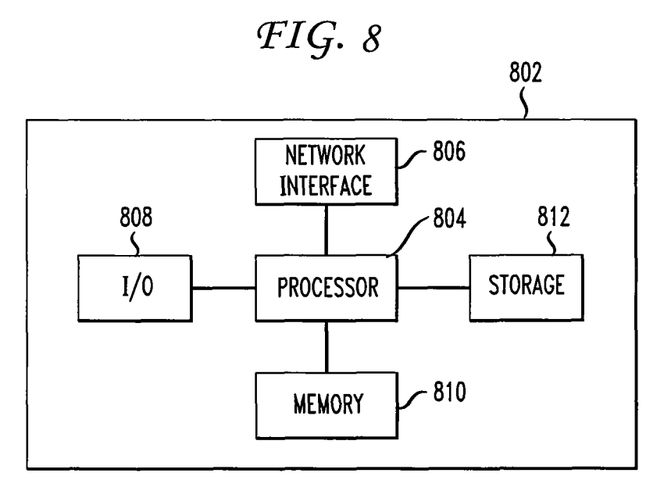
FIG. 8 is a high-level block diagram of a computer for implementing components of the network shown in FIG. 1 and the methods of FIGS. 4 and 5.

Components of IMS network 100 (e.g., IMS UE 102, SBC 104, S-CSFC 106, ENUM 108, P-CSCF 110, AS 112, HSS 114, and DNS 116) as well as the components depicted in FIGS. 3 and 4 and the methods depicted in FIGS. 4 and 7 may be implemented using a computer. A high-level block diagram of such a computer is illustrated in FIG. 8. Computer 802 contains a processor 604 which controls the overall operation of the computer 802 by executing computer program instructions which define such operation. The computer program instructions may be stored in a storage device 812, or other computer readable medium (e.g., magnetic disk, CD ROM, etc.), and loaded into memory 810 when execution of the computer program instructions is desired. Thus, the method steps of FIGS. 4 and 7 can be defined by the computer program instructions stored in the memory 810 and/or storage 812 and controlled by the processor 504 executing the computer program instructions. For example, the computer program instructions can be implemented as computer executable code programmed by one skilled in the art to perform an algorithm defined by the method steps of FIGS. 4 and 7. Accordingly, by executing the computer program instructions, the processor 804 executes an algorithm defined by the method steps of FIGS. 4 and 7. The computer 802 also includes one or more network interfaces 606 for communicating with other devices via a network. The computer 802 also includes input/output devices 808 that enable user interaction with the computer 802 (e.g., display, keyboard, mouse, speakers, buttons, etc.) One skilled in the art will recognize that an implementation of an actual computer could contain other components as well, and that FIG. 8 is a high level representation of some of the components of such a computer for illustrative purposes.

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the general inventive concept and that various modifications may be implemented by those skilled in the art without departing from the scope and spirit of the inventive concept. Those skilled in the art could implement various other feature combinations without departing from the scope and spirit of the inventive concept.

The invention claimed is:

1. A method for determining a called party home domain comprising:
    partitioning a national subscriber profile covering a geographic area into a plurality of regions, each of the plurality of regions designated as internet multimedia subsystem serving area;
    receiving a request, at a network component, from a calling party to establish communication with a called party of a plurality of parties, each of the plurality of parties associated with a respective internet multimedia subsystem serving area;
    determining a name authority pointer associated with the called party by querying a local copy of a telephone numbering database in a home domain of the calling party based on the request, the name authority pointer comprising data identifying the called party home domain and a region of the plurality of regions of the national subscriber profile in which the called party is located;
    determining a domain name of a device located in the called party home domain identified in the name authority pointer;
    determining an internet protocol address of the device located in the called party home domain identified in the name authority pointer based on the domain name; and
    transmitting a request to the called party home domain based on the internet protocol address of the device located in the called party home domain.

2. The method of claim 1 wherein the request comprises an E.164 phone number associated with the called party.

3. An apparatus for determining a called party home domain comprising:
    a processor; and
    a memory to store computer program instructions, the computer program instructions when executed on the processor cause the processor to perform operations comprising:
    partitioning a national subscriber profile covering a geographic area into a plurality of regions, each of the plurality of regions designated as internet multimedia subsystem serving area;
    receiving a request from a calling party to establish communication with a called party of a plurality of parties, each of the plurality of parties associated with a respective internet multimedia subsystem serving area;
    determining a name authority pointer associated with the called party by querying a local copy of a telephone numbering database in a home domain of the calling party based on the request, the name authority pointer comprising data identifying the called party home domain and a region of the plurality of regions of the national subscriber profile in which the called party is located;
    determining a domain name of a device located in the called party home domain identified in the name authority pointer;
    determining an internet protocol address of the device located in the called party home domain identified in the name authority pointer based on the domain name; and
    transmitting a request to the called party home domain based on the internet protocol address of the device located in the called party home domain.

4. The apparatus of claim 3 wherein the request comprises an E.164 phone number associated with the called party.

5. A computer-readable storage device storing computer program instructions for determining a called party home domain, which, when executed on a processor, cause the processor to perform operations comprising:
    partitioning a national subscriber profile covering a geographic area into a plurality of regions, each of the plurality of regions designated as internet multimedia subsystem serving area;
    receiving a request, at a network component, from a calling party to establish communication with a called party of a plurality of parties, each of the plurality of parties associated with a respective internet multimedia subsystem serving area;
    determining a name authority pointer associated with the called party by querying a local copy of a telephone numbering database in a home domain of the calling party based on the request, the name authority pointer comprising data identifying the called party home domain and a region of the plurality of regions of the national subscriber profile in which the called party is located;
    determining a domain name of a device located in the called party home domain identified in the name authority pointer;
    determining an internet protocol address of the device located in the called party home domain identified in the name authority pointer based on the domain name; and
    transmitting a request to the called party home domain based on the internet protocol address of the device located in the called party home domain.

6. The computer-readable storage device of claim 5 wherein the request comprises an E.164 phone number associated with the called party.

\* \* \* \* \*